(12) United States Patent
Hu (10) Patent No.: US 7,752,139 B2
(45) Date of Patent: Jul. 6, 2010

(54) METHOD AND SYSTEM FOR MANAGING SOFTWARE LICENSES AND REDUCING UNAUTHORIZED USE OF SOFTWARE

(76) Inventor: Michael Noel Hu, 2 20659 Eastleigh Crescent, Langley, BC (CA) V3A 4C3

( * ) Notice: Subject to any disclaimer, the term of this patent is extended or adjusted under 35 U.S.C. 154(b) by 1225 days.

(21) Appl. No.: 11/319,001

(22) Filed: Dec. 27, 2005

(65) Prior Publication Data

US 2007/0150417 A1    Jun. 28, 2007

(51) Int. Cl.
*G06F 21/00* (2006.01)
(52) U.S. Cl. .......................... 705/59; 705/51; 717/102; 717/103; 717/126
(58) Field of Classification Search ................. 705/51, 705/59; 717/102–103, 126
See application file for complete search history.

(56) References Cited

U.S. PATENT DOCUMENTS

| | | | |
|---|---|---|---|
| 4,683,968 A | | 8/1987 | Appelbaum et al. |
| 6,681,323 B1* | | 1/2004 | Fontanesi et al. ............. 713/1 |
| 2001/0034712 A1* | | 10/2001 | Colvin ........................ 705/52 |
| 2002/0091645 A1* | | 7/2002 | Tohyama ..................... 705/59 |
| 2002/0107809 A1* | | 8/2002 | Biddle et al. ................. 705/59 |
| 2004/0204949 A1* | | 10/2004 | Shaji et al. ..................... 705/1 |
| 2004/0215627 A1* | | 10/2004 | Whalen et al. ............. 707/100 |
| 2005/0273437 A1* | | 12/2005 | Coley et al. ................. 705/59 |

FOREIGN PATENT DOCUMENTS

| | | |
|---|---|---|
| CA | 1147823 | 6/1983 |
| CA | 1262575 | 10/1989 |
| CA | 2303049 | 4/1999 |
| CA | 2231978 | 11/1999 |
| CA | 2335298 | 12/1999 |
| CA | 2287013 | 4/2000 |
| CA | 2267041 | 9/2000 |

(Continued)

OTHER PUBLICATIONS

"How Remote Installation Services Work." Microsoft Technet. Mar. 28, 2003. All pages. Retrieved Jan. 27, 2010. http://technet.microsoft.com/en-us/library/cc782566(WS.10).aspx.*

(Continued)

*Primary Examiner*—Evens J. Augustin
*Assistant Examiner*—Calvin K Cheung
(74) *Attorney, Agent, or Firm*—Chen Yoshimura LLP (57) ABSTRACT

A method and system for software license management that allows a user to easily move a software license from one computer to another and the software vendor to control unlicensed use. A server maintains user account information including computers licensed to run the software and computers no longer licensed to run the software. A computer is enabled to run the software in an initialization process, and re-enabled by the server from time to time in an automatic re-enable process. If a non-enabled computer attempts to run the software, the user is given a choice to acquire a new license for the computer, move the license from an existing licensed computer to the current computer, or exit. If a new license is bought or an existing license moved, the server updates the information of enabled and no-longer-enabled computers accordingly.

29 Claims, 4 Drawing Sheets

FOREIGN PATENT DOCUMENTS

| CA | 2393543 | 6/2001 |
|---|---|---|
| CA | 2429587 | 4/2003 |
| CA | 2483605 | 11/2003 |
| CA | 2415334 | 6/2004 |

OTHER PUBLICATIONS

"What Is Remote Installation Services?" Microsoft Technet. Mar. 28, 2003. All pages. Retrieved Jan. 27, 2010. http://technet.microsoft.com/en-us/library/cc776559(WS.10).aspx.*

"Remote Installation Services Tools and Settings." Microsoft Technet. Mar. 28, 2003. All pages. Retrieved Jan. 27, 2010. http://technet.microsoft.com/en-us/library/cc787321(WS.10).aspx.*

Macromedia Product Activation Center, website: http://www.macromedia.com/software/activation/, 1 page, printed from the Internet on Dec. 23, 2005.

Macrovision FLEXnet Publisher Licensing Module, website: http://www.macrovision.com/products/flexnet_publisher/licensing/index.shtml, 2 pages, printed from the Internet on Dec. 23, 2005.

Softwareshield, website: http://www.softwareshield.com/, 3 pages, printed from the Internet on Dec. 23, 2005.

* cited by examiner

METHOD AND SYSTEM FOR MANAGING SOFTWARE LICENSES AND REDUCING UNAUTHORIZED USE OF SOFTWARE

BACKGROUND OF THE INVENTION

1. Field of the Invention

This invention relates to computer software distribution, and in particular, it relates to a method and system for managing software licenses and reducing unauthorized use of software.

2. Description of the Related Art

By some accounts, the software industry lost $29 billion to piracy in 2003. Software piracy is a serious offence of the intellectual property rights of the software developers and publishers. Software is easy to copy illegally, and therefore steal; thus, systems that reduce or prevent software piracy can save software publishers billions of dollars.

Various anti-piracy schemes have been described or deployed in products. One common approach to reducing software piracy is product activation. It requires users to activate (or enable) their purchased software within a grace period (such as 50 product launches) or have it disabled on their computer. Once the user activates a piece of software (having a unique software id assigned to it) on a particular computer, the activation process creates a globally unique identifier from arbitrary pieces of the computer's hardware (called a hardware hash), connects the computer to a centralized server on the Internet, and registers the (hardware hash, software id)-tuple. If the same software (with the same software id) is installed on another computer and is request to be registered again, the same software id will map to a different hardware hash, thus allowing the server to recognize that the same piece of software was illegally installed on more than one computer. If this is considered software piracy, the server will refuse to enable the software on the other computer, thus preventing the user from committing piracy. Product activation is one of the most popular anti-piracy measures for major software companies, but has various problems. It is inconvenient to legitimate users who upgrade their computer, and requires a large technical support team to handle computer upgrades. It is also not able to disable software on pirates' computers.

Macromedia has implemented an improvement to the traditional product activation algorithm in that it provides a web interface (http://www.macromedia.com/software/activation/) for users to move their license from one computer to another. However, it requires the user to first unregister/uninstall the software from the old computer, and then install it on another computer. This is problematic in the relatively frequent case when the old computer crashes and it is no longer possible to uninstall it from the old computer. Furthermore, many users would just simply forget to uninstall the software from the old computer before formatting it, which also defeats this "uninstall and move-license" scheme.

Some other anti-piracy methods described in patent applications or printed publications are discussed below. Canadian patent application 2267041, entitled Method and System for Protecting a Software Application from Piracy, describes a method using smart cards to authenticate the user (see Abstract). Canadian patent application 2287013, entitled Method of Distributing Piracy Protected Computer Software, describes encoding biometric information into the software before shipping it (see Abstract). Canadian patent application 2335298, entitled Bait Software, describes encoding identifiers into the distributed software and disabling pirated software through updates on a drop dead date. Canadian patent application 2393543, entitled Portable Authorization Device for Authorizing Use of Protected Information and Associated Method, describes using a hardware-based portable authorization device to authenticate the user (see Abstract). Canadian patent application 2483605, entitled Method and Apparatus for Protecting Information and Privacy, describes a sophisticated and complex system for preventing piracy, even against determined hackers. It uses a User Device Descriptive Value (UDDV) that is similar to the hardware hash of product activation and is intended to uniquely identify a computer from its hardware and state. This scheme is inconvenient to legitimate users who upgrade their computer, and requires a large technical support team to handle computer upgrades. Canadian patent application 2429587, entitled Systems and Methods for Preventing Unauthorized Use of Digital Content, describes a variant of product activation, which requires an additional step of downloading a System ID tool. Canadian patent application 2415334, entitled System for Persistently Encrypting Critical Software Data to Control Operation of an Executable Software Program, describes a method that dynamically decrypts parts of the software itself during execution using an activation code that is keyed to the hardware (see Abstract). Canadian patent application 2303049, entitled Method and System of Dynamic Transformation of Encrypted Material, describes an apparatus that is "implemented as a virtually integral part of the operating system that monitors and 'filter' all read, write, and open/execute access [sic] to and from the I/O devices" (see Abstract). Canadian patent application 2231978, entitled Bigsoft Brother—Software Method for Tracking and Identifying Illegal Software Piracy, Installation, Copying and Theft of Software, describes a variant of product activation using a hard drive id rather than a basket of hardware identifiers to identify a computer. Canadian patent 1262575 (corresponding to U.S. Pat. No. 4,683,968), entitled System for Preventing Software Piracy Employing Multi-Encrypted Keys and Single Decryption Circuit Modules, describes the use of dongles, small hardware devices that connect to computers and act as authentication keys for particular pieces of software (see Abstract). Canadian patent 1147823, entitled Crypto Microprocessor for Executing Enciphered Programs, proposes a customized microprocessor for decoding an encrypted file on the fly as it is being executed (see Abstract). This patent will not work for the mass distribution of software on computers that the average user has already bought. Many of the above methods make it expensive and complex to distribute the software or inconvenience the legitimate users.

SUMMARY OF THE INVENTION

The inventor of the present invention have studied the above-described existing anti-piracy schemes and recognized some of the problems with these schemes.

Accordingly, the present invention is directed to a method of managing software licenses that substantially obviates one or more of the problems due to limitations and disadvantages of the related art.

An object of the present invention is to provide a method of moving a license from one computer to another in an easy way and without having to contact technical support.

Another object of the present invention is to provide an easy way to buy an additional license. Making it easy to buy an additional license could be a very profitable feature for vendors.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method implemented on a server for managing licenses for a piece of software, which includes: (a) maintaining a user account database for the software, the database including, for each user account, account authentication information, information regarding a license policy, identifiers of computers licensed to run the software, and identifiers of computers no longer licensed to run the software; (b) initializing the software on a first computer, including: (b1) receiving account authentication information and computer identification information from the first computer; (b2) executing a policy decision algorithm based on the computer identification information and the license policy associated with the user account corresponding to the account authentication information to make an enable or disable decision; (b3) if an enable decision is made, sending an enable command to the first computer to enable the first computer to run the software, and designating the first computer in the database as licensed to run the software; and (b4) if a disable decision is made, sending a disable command to the first computer to disable the first computer from running the software; and (c) re-enabling the software on a second computer, the second computer being the same as or different from the first computer, including: (c1) receiving account authentication information and computer identification information from the second computer; (c2) executing a policy decision algorithm based on the computer identification information and the license policy associated with the user account corresponding to the account authentication information to make an enable or disable decision; (c3) if an enable decision is made, sending an enable command to the second computer to enable the second computer to run the software; (c4) if a disable decision is made, sending a disable command to the second computer to disable the second computer from running the software; and (c5) if an instruction to move a license from another computer is received from the second computer in response to the disable command, sending an enable command to the second computer to enable the second computer to run the software, designating the second computer in the database as licensed to run the software, and designating the other computer in the database as no longer licensed to run the software. Step (c) may also include: (c6) if an instruction to acquire a new license is received from the second computer in response to the disable command, sending an enable command to the second computer to enable the second computer to run the software, and designating the second computer in the database as licensed to run the software.

In another aspect, the present invention provides a method implemented on a user computer for managing licenses for a piece of software, which includes: (a) initializing the software on the user computer, including: (a1) sending account authentication information and computer identification information to a server; (a2) receiving an enable or disable command from the server; (a3) if an enable command is received, enabling the computer to run the software; and (a4) if a disable command is received, disabling the computer from running the software; and (b) re-enabling the software on the computer, including: (b1) sending account authentication information and computer identification information to a server; (b2) receiving an enable or disable command from the server; (b3) if an enable command is received, enabling the computer to run the software; (b4) if a disable command is received, disabling the computer from running the software, and presenting an option to a user to move an existing license from another computer to the computer; and (b5) if an instruction to move a license from another computer is received from the user, sending an instruction to move a license to the server. Step (b4) may further including presenting an option to the user to acquire a new license for the computer, and step (b) may further include: (b6) if an instruction to acquire a new license is received from the user, sending an instruction to acquire a new license to the server.

In another aspect, the present invention provides a method for managing licenses for a piece of software, which includes: (a) maintaining a user account database for the software on a server, the database including, for each user account, account authentication information, information regarding a license policy, identifiers of computers licensed to run the software, and identifiers of computers no longer licensed to run the software; (b) initializing the software on a first computer, including: (b1) the first computer sending account authentication information and computer identification information to the server; (b2) the server executing a policy decision algorithm based on the computer identification information and the license policy associated with the user account corresponding to the account authentication information to make an enable or disable decision; (b3) if an enable decision is made, the server sending an enable command to the first computer, and designating the first computer in the database as licensed to run the software; (b4) the first computer enabling itself to run the software upon receiving the enable command; (b5) if a disable decision is made, the server sending a disable command to the first computer; and (b6) the first computer disabling itself from running the software upon receiving the disable command; and (c) re-enabling the software to run on a second computer, the second computer being the same as or different from the first computer, including: (c1) the second computer sending account authentication information and computer identification information to the server; (c2) the server executing a policy decision algorithm based on the computer identification information and the license policy associated with the user account corresponding to the account authentication information to make an enable or disable decision; (c3) if an enable decision is made, the server sending an enable command to the second computer; (c4) the second computer enabling itself to run the software upon receiving the enable command; (c5) if a disable decision is made, the server sending a disable command to the second computer; (c6) the second computer disabling itself from running the software upon receiving the disable command, and presenting an option to a user to move an existing license from another computer to the computer; (c7) if an instruction to move a license from another computer is received from the user, the second computer sending an instruction to move a license to the server; (c8) the server sending an enable command to the second computer upon receiving an instruction to move a license from another computer, designating the second computer as licensed to run the software, and designating the other computer as no longer licensed to run the software. Step (c6) may further includes presenting an option to the user to acquire a new license for the computer, and step (c) may further include: (c9) if an instruction to acquire a new license is received from the user, the second computer sending an instruction to acquire a new license to the server; and (c10) the server sending an enable command to the second computer upon receiving an instruction to acquire a new license, and designating the second computer as licensed to run the software.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
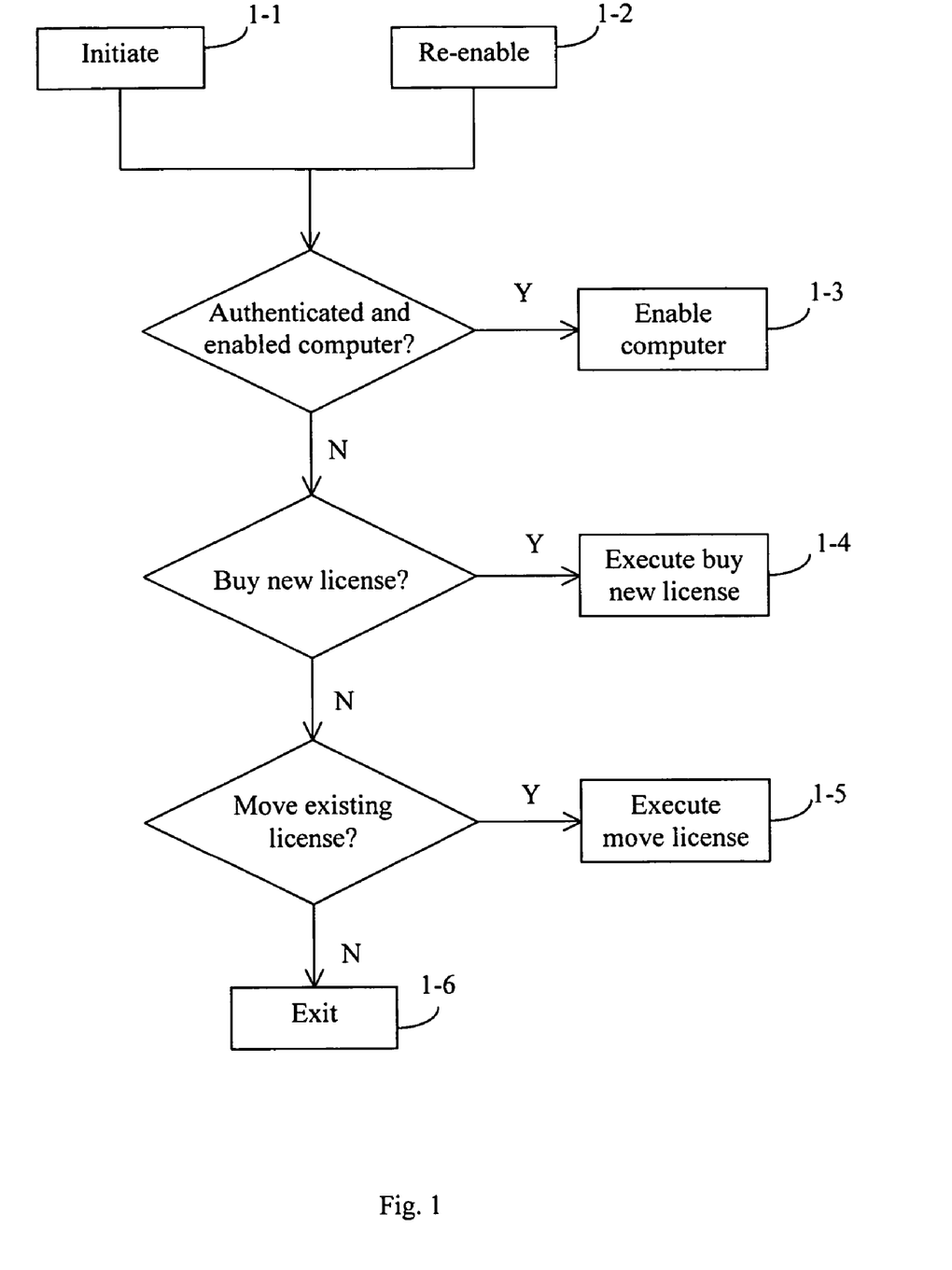
FIG. 1 illustrates a software license management method according to an embodiment of the present invention.

Embodiments of the present invention provide a client-server system for managing software licenses and reducing large-scale software piracy. FIG. 1 illustrates the overall operation of the software license management method and system according to embodiments of the present invention. An initialization process is carried out at the time or after the software is purchased to authenticate and enable a computer on which the software is installed and run (Step 1-1). Thereafter, a re-enable operation is carried out automatically from time to time when the software is run or being launched on the user's computer (Step 1-2). In both the initialization process and the re-enable process, a server determines whether the particular computer running or attempting to run the software should be enabled to run the software. If the server determines that the computer is authenticated and should be enabled, the computer is enabled or re-enabled to run the software (Step 1-3). If the server determines that the computer should not be enabled (for example, if the user obtained a copy of the software from a legitimate licensee and has not purchased a license to run it on the user's computer, or if a previous license for the computer has been moved), the computer will not be enabled to run the software. In such a situation, the user is given a choice to acquire a new license of the software for the computer (Step 1-4), or move the license from an existing enabled computer to the current computer (Step 1-5), or exit (i.e. the software will not be enabled to run on the current computer) (Step 1-6). If a license is moved from another computer to the current computer (as in Step 1-5), the computer from which the license is moved will fail its next re-enable operation (Step 1-2). Once a license has been moved, it can no longer be moved back to the original computer unless the user contacts user support. This prevents two users from sharing one license by moving the license back and forth between two computers.

It can be seen that the software license management and anti-piracy method according to embodiments of the present invention changes the disable-computer policy to disable an existing (already enabled) computer rather than the new computer to be enabled when piracy is detected. Hence, it will no longer be in a software user's interest to give the software to another person, because enabling the software on the other person's computer will disable that user's own copy of the software. This method recognizes that software piracy is a technical problem as well as a sociological one, and changes the anti-piracy policy so that users who act in their own best interest will act in the vendor's best interest.

Figure 2:
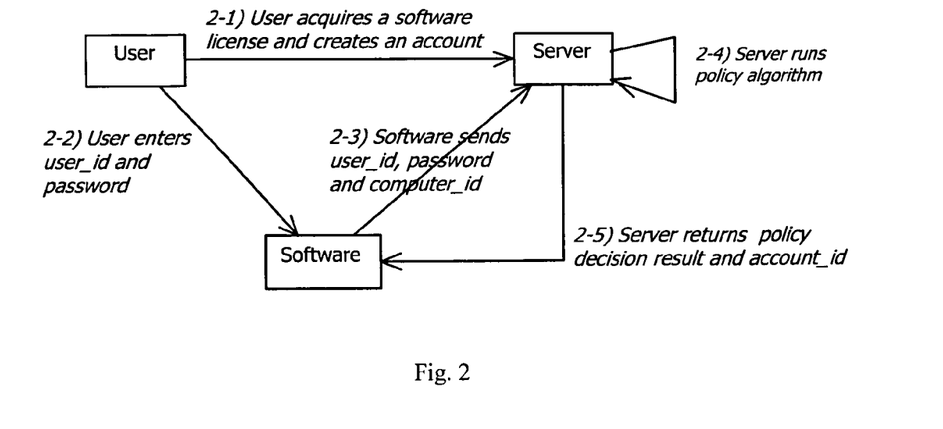
FIG. 2 illustrates the initialization process of the method of FIG. 1.

An implementation of this software license management and anti-piracy scheme and its variations are described with reference to FIGS. 2-5. This implementation requires that the computers attempting to run the software be connected to a network such as the Internet that allows them to communicate with a server on the network. FIG. 2 illustrates the initialization process (Step 1-1) of the method of FIG. 1. First, a user 11 creates a user account on a server 12 maintained by or on behalf of the vendor of the software (Step 2-1). The server may be any suitable computer. For most software vendors, account creation occurs when the user acquires (which may or may not involve a payment of money) software and a license from the vendor, such as through a web interface. The account is associated with the license and account authentication information, such as the user_id (which may be the user's email address) and password, on the server. When the user then installs the software on a computer 13 and runs it, the software on the computer detects that it has not run through the initialization process yet, and asks the user to enter his account authentication information (e.g. user_id and password) (Step 2-2). The account authentication information is used to authenticate the user, i.e., to associate the user with an account on the server. The user_id/password paradigm is the most common way to authenticate the user, but other methods such as biometrics, dongles, smart cards, etc. may also be used for this purpose. Upon receiving the account authentication information, the software sends it to the server, together with a computer_id (computer identification information) which is information that uniquely identifies the computer on which the software is run (Step 2-3). The computer_id may be as simple as the MAC address of the Ethernet card. More complex implementations use a basket of hardware identifiers such as motherboard and hard drive serial numbers as the computer_id. To protect the user's privacy, the hardware-derived computer_id may be run through a one-way transformation algorithm such as a CRC32 so that the vendor would not be able to reverse-engineer the computer's hardware identity from the stored computer_ids. Another computer_id generation algorithm is to generate a random number on the client computer and store it in an obfuscated place. Or, this random number could be generated by the server and returned to client computer to store it in an obfuscated place.

Alternatively, for shrink-wrapped software (e.g. software acquired on a CD) which does not involve on-line purchase, the account creation step (Step 2-1) may be done after the authentication step (Steps 2-2 and 2-3). In other words, the user creates an account on the server by activating his software through the authentication step.

After receiving the account authentication information and the computer_id, the server authenticates the user by his account authentication information, and makes a policy decision whether to enable or disable the software based on that computer_id and the user's acquired license agreement (Step 2-4). The policy decision depends on what licensing scheme the user has acquired from the vendor. For example, if the user only acquired a license to one computer, then attempting to enable another computer as discriminated by the differing computer_id will fail the policy check. If the vendor implements a floating license scheme (e.g. a license designed for a company team, so that up to a maximum number of computers within the company can use the software product at one time, but on any computer that they like), then attempting to enable another computer while a maximum number of computers are already running the software (again, as discriminated by the differing computer_ids) will fail the policy check. Because the server stores information about each user's account, including the license policy the user acquired and computers that have already been authenticated and are currently enabled, the server is able to make the policy decision regarding the computer that the user is trying to authenticate and enable. This scheme allows a software vendor to implement and enforce a variety of licensing schemes. More formally, the policy check may be implemented on the server as follows: Enable_Computer=Policy_function (account_id's license_agreement, computer_id), where account_id (account identification) is a server-generated id for the account authentication information (user_id/password). If there is no account corresponding to the account authentication information received from the computer 13, then the server will ask the computer to re-enter that information and try again. The server returns the result of the policy decision to the computer (Step 2-5) so that the user can be notified of the result. If the computer 13 is to be enabled, the server associates the computer_id and optionally a timestamp with that account and account_id, thereby designating the computer as being licensed. The server also returns the account_id and an allow_access command (i.e. an enable command) to the computer, so that the computer is enabled to run the software. The computer caches the account_id. If the computer is to be disabled, then the server returns a deny_access command (i.e. a disable command) to the computer, so that the computer is disabled from running the software.

The initialization process is performed for both a legitimate copy of the software and an illegitimate copy. If the copy is illegitimate, the computer will not be enabled and the user will be offered the opportunity to acquire a license for the computer, or move the license from another computer (described later with reference to FIGS. 4 and 5).

An initialization process is used with several commercial implementations available today. See, for example, http://www.macrovision.com/products/flexnet_publisher/licensing/index.shtml and http://www.softwareshield.com/.

After a computer has been authenticated and enabled in the initialization process, a re-enable process (FIG. 3) for re-enabling the software on such a computer is carried out from time to time. The re-enable process is also carried out on a computer that is running an illegitimate copy of the software (for example, the copy of the software may become illegitimate after the license has been moved from this computer to another computer). The schedule of when to execute this re-enable process is determined by the software vendor, although the most natural time to run it is when the user initially launches the software. The process is performed by the software's anti-piracy program module.

Figure 3:
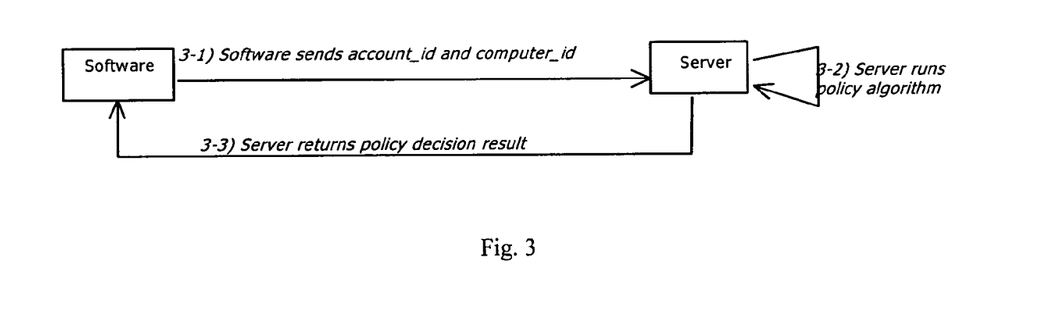
FIG. 3 illustrates the re-enabling process of the method of FIG. 1.

In the re-enable process, as shown in FIG. 3, the anti-piracy program module running on the computer 13 reads the account_id from the computer's storage, and sends the account_id (previously cached in the initialization process) and the computer_id to the server 12 (Step 3-1). By using the account_id, the program does not have to store the password or ask the user to re-enter the password after initialization, thus increasing password security and improving user experience. The account_id and computer_id are enough to identify the licensed user. The server makes a policy decision whether to enable the software (Step 3-2). The policy decision is identical or similar to the policy decision step (Step 2-4) in the initialization process. In other words, the server runs Enable_Computer=Policy_function (account_id's license_agreement, computer_id) again. The server returns the result of the policy decision to the computer (Step 3-3). If the computer is to be enabled, the server returns an allow_access command to the computer. Otherwise, the server returns deny_access command to the computer. The above process of enabling the software on an already authenticated computer is implemented in several commercial products available today and some examples may be found at http://www.macrovision.com/products/flexnet_publisher/licensing/index.shtml and http://www.softwareshield.com/.

Figure 4:
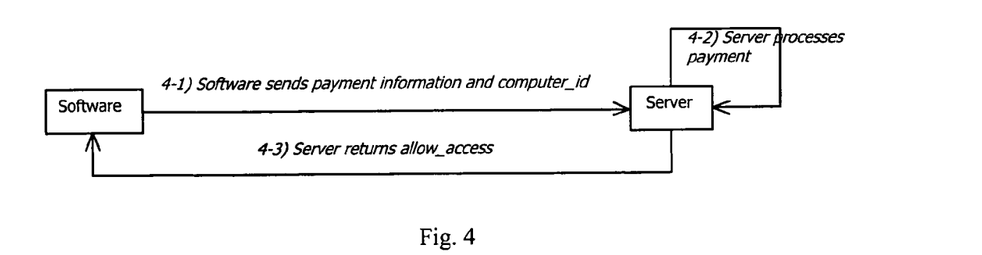
FIG. 4 illustrates a process of acquiring an additional license in the method of FIG. 1.

If the computer 13 receives a deny_access command (during either the initialization or the re-enable process), the anti-piracy program gives the user the options to acquire an additional license, move an existing license, or exit (see FIG. 1). If the user chooses to acquire an additional license, an acquire new license process shown FIG. 4 is performed. The program sends the computer_id to the server, along with payment information entered by the user (e.g. credit card information) if payment is required (Step 4-1). The server attempts to process the payment if appropriate (e.g. charge the credit card) (Step 4-2). If the server cannot successfully process the payment, it may ask the user to try again. In an alternative embodiment, payment is not required if the software vendor offers a free license, or a time-limited license. If the server successfully processed the payment, then it associates the computer_id and a current timestamp to an account, thereby designating the computer as being licensed to run the software, and returns an allow_access result. A new account corresponding to a new user_id and password may be created for the newly acquired license, or the license may be associated with an existing account (for example, the same user may have two computers and license two copies of the software). The server generates and returns an account_id as done in the initialization process.

Figure 5:
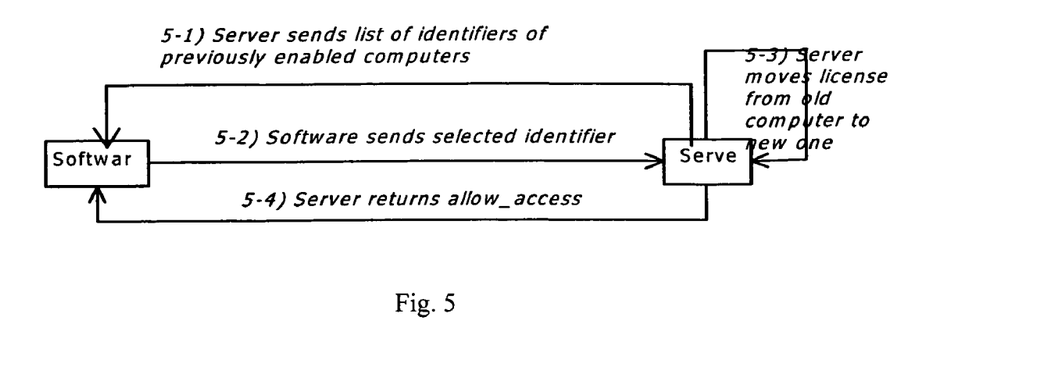
FIG. 5 illustrates a process of moving an existing license in the method of FIG. 1.

If the user chooses to move an existing license from one computer to another computer, a move license process shown in FIG. 5 is performed. The server sends the anti-piracy program on the computer a list of identifiers that identify computers that are presently licensed and enabled to run the software (Step 5-1). The identifiers may be timestamps associated with the licensed computers, features associated with a license, and/or nicknames that have been previously assigned by the user to the licensed computers (e.g. during the initialization process) and stored at the server. The purpose of providing the list of identifiers is to help the user choose which computer to move the license from if the user has licensed several computers. The user can choose one of the identified computers to move the license from, and sends the selection to the server (Step 5-2). The server then moves the computer_id associated with the selected identifier to a "black list" to designate that computer as no longer being licensed, and associates the computer_id for the current computer to the user's account to designate the current computer as being licensed to run the software (Step 5-3). This effects a move of the license from the old computer to the current one. The server sends an allow_access command to the current computer (Step 5-4). From now on, if the computer moved to the black list attempts to run the software, the server will deny its access. To re-enable a computer on the black list, the user can acquire a license for that computer, or alternatively, technical support personnel of the vendor may be allowed to re-enable that computer (e.g. by removing it from the black list) upon the user's request.

To increase security, the server may require the user_id/password authentication information to move a license. If the move-license process occurs during the initialization process, the user will have already entered the user_id and password.

If, on the other hand, the move-license process occurs during a re-enabling process, the server may require the user to enter his user_id and password in order to move a license.

By using the above described license management scheme, if the user of legitimately licensed software gives a copy of the software to another person, and the other person enables the software on his/her own computer by moving the license to his computer instead of acquiring a new license, then the original user will lose the ability to run the software on his/her computer. This operates as a disincentive for a licensed user to give copies of the software to other persons.

The license management and anti-piracy scheme described above may be used to perform additional optional functions. For example, it may be used to disable existing software. If the vendor wishes to disable existing software for any reason, such as detected piracy, old version, returned software, etc., the vendor may move the computer_ids associated with an account to the black list. The next time a computer on that black list starts up, the software will refuse to run. The scheme may also be used to re-enable existing software. In response to a technical support request, the vendor can re-enable software that has been disabled by removing its computer_id from the black list.

Figure 6A:
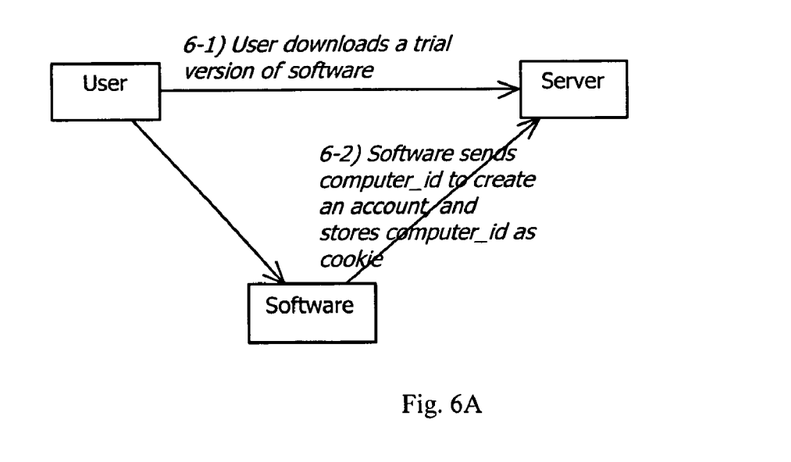
FIGS. 6A-6C illustrate an initialization process according to an alternative embodiment of the present invention.
Figure 6B:
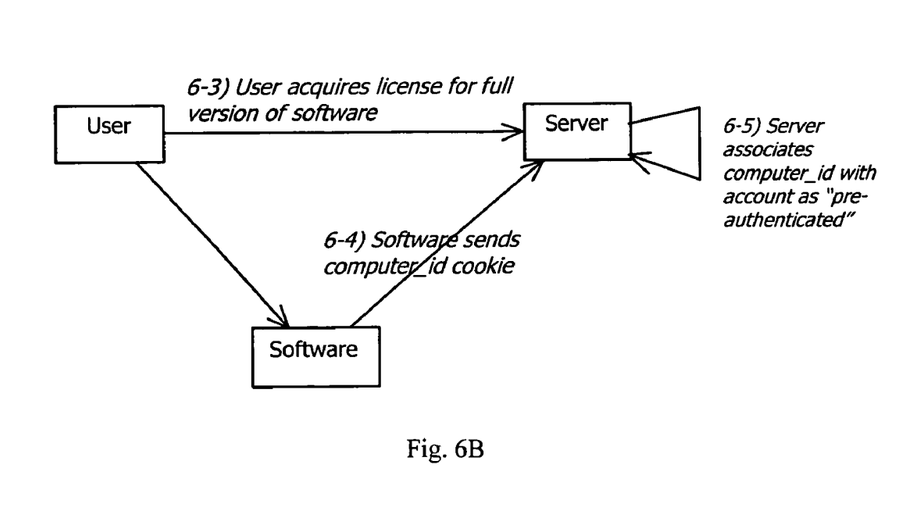
Figure 6C:
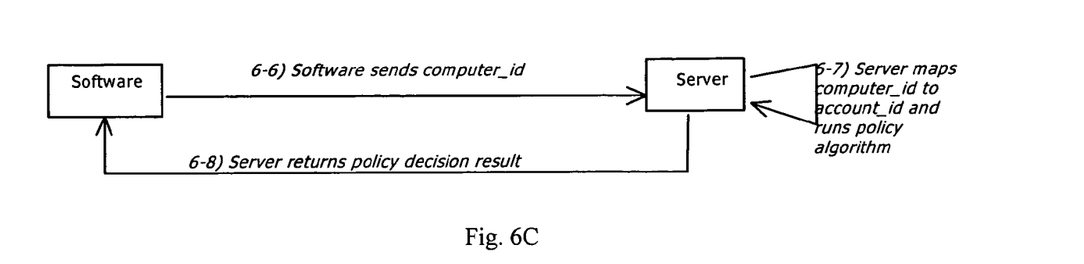

An alternative initialization process is described with reference to FIGS. 6A-6C. In the initialization process described in FIG. 2, the user is required to enter account authentication information (e.g. user_id and password) upon first authentication. If a user forgets his user_id and password, he would have to contact user support. Furthermore, some customers expect to buy a trial version of the software on the server, and never have to enter any information into their existing trial version to upgrade it to the full version after entering that information into the purchasing server (usually a buypage on the vendor's website). The alternative initialization process shown in FIGS. 6A-6C implements this desired behavior. Note here that the trial version and full version of the software may be the same software except for the different rights associated with it. The server can send "enable_feature" code to the client during the enable process to upgrade the trial version to the full version.

First, the user downloads a trial version of the software which contains a small licensing module and runs it on his computer (Step 6-1). It asks the user permission to contact the vendor's server to start the trial. In an alternative embodiment, the module can ask the user his name, email, whether he wants to receive promotional emails, or any other marketing/demographic information that the vendor wants to collect. The module sends this information to the server webpage, along with the computer_id (there is no need to create an account at this point, because the account-specific information is stored on the client side (ie: computer_id) and transmitted during the buy process, and the account can be created at that time). This webpage instructs the client's browser to store the computer_id in the browser's cookie cache (Step 6-2). In an alternative embodiment, this webpage may be displayed to the user, thus providing another marketing opportunity. When user later acquires a license to use the full version of the software through the vendor webpage (using his cookie-enabled browser) (Step 6-3), this cookie is sent to the server (Step 6-4) as part of the buy process on that web server. The server then associates the computer_id with the user's account as a "pre-authenticated" computer for that account (Step 6-5). The next time the user launches the software, it sends the computer_id to the server (Step 6-6), which maps it to that user's account_id. The Policy_function( ) is then run for that account (Step 6-7), which should return allow_access as the user just bought an additional license for that account (Step 6-8). If access is to be allowed, the server may also send the account_id to the client which may then be stored by the client software as in the initialization process of FIG. 2. Under this alternative initialization process, the client software does not have to ask the user for the user_id and password to enable itself, as the computer_id itself is used to authenticate the user. This scheme will auto-enable the software for the user and thus make the entire "trial download, buy license, install license to upgrade to fully licensed version" process seamless for the user.

This alternative initialization method assumes that the user buys the software from a computer and licenses the software for use on the same computer. If the user buys the software on one computer and licenses it on another, the computer_id for the computer to be licensed would be different from the "pre-authenticated" computer_id (the computer used to buy the license), and thus no mapping from the computer_id to account_id would occur. In this situation, the user will be asked to enter his user_id and password to authenticate himself and look up the account_id, whereupon Policy_function( ) would run.

Figure 7:
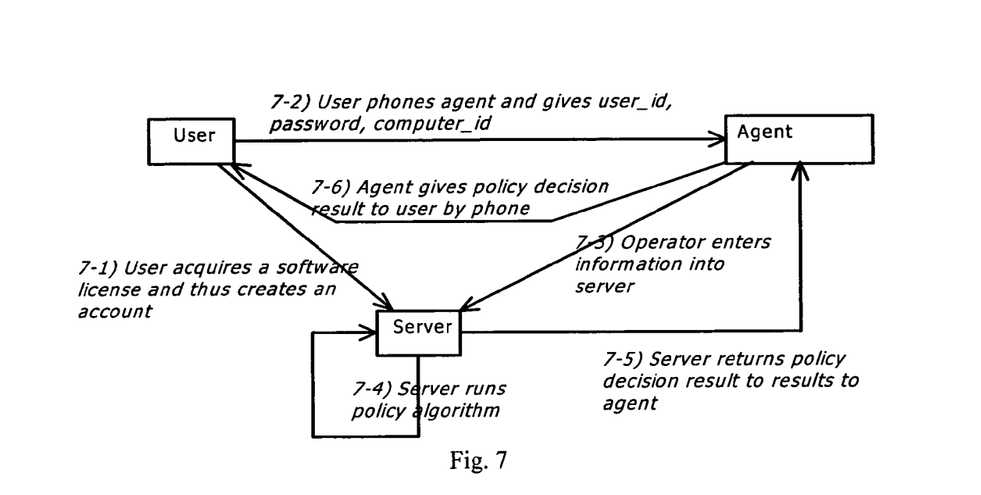
FIG. 7 illustrates an alternative implementation of the software license management method using a telephone operator to facilitate the interaction between a use and the server.

The implementation described above with reference to FIGS. 2 to 6 requires the computers running the software to be connected to the server via a network such as the Internet. An alternative method, when a network connection is not available on the user's computer, is for the user 11 to communicate with an agent 14 of the software vendor via telephone, where the agent (often referred to as technical support staff or telephone operator) acts as an intermediary between the user and the server 12, as shown in FIG. 7. The initialization process shown in FIG. 7 is similar to that shown in FIG. 2, but the software running on the client computer and the server communicate via the user 11 and the agent 14 rather than directly. First, the user 11 acquires a software license and creates an account (Step 7-1). The user calls an agent 14 of the vendor by telephone and gives the agent his account authentication information (e.g. user_id and password) and computer_id (Step 7-2). To facilitate this step, the software can be programmed to display the computer_id to the user. The agent enters the account authentication information and the computer_id into the server 12 (Step 7-3), and the server makes a policy decision whether to enable the software (Step 7-4) in a step identical to Step 2-4 of the initialization process of FIG. 2. The server returns the results of the policy decision to the agent (Step 7-5). The agent informs the user of the policy decision results over the telephone (Step 7-6). If the computer is to be enabled, the agent gives the user his account_id (generated by the server) which the user enters into the software to enable it. If the computer is to be disabled, the agent gives the user the options to acquire a new license, move an existing license to the current computer, or exit. Re-enabling a computer, acquiring a new license and moving an existing license can also be accomplished with the assistance of the agent using the input from the user over the telephone, and details are omitted here.

In this alternative implementation using telephone communication, the user must read his account authentication information (user_id, password) and computer_id over the telephone to the agent and the agent must read the account_id over the telephone to the user. There are possibilities for errors in both cases. To prevent such errors, the software or the server may run a CRC over the spoken inputs and ask the sending party to read the CRC in addition to the other input. The receiver enters the information with the CRC into their program (the agent's program would reside on the server) which then would flag any typographical errors.

The implementation of the enabling process for enabling the software on an already authenticated computer shown in FIG. 3 requires a network connection so that the software can disable itself if the license has been moved to another computer. Several alternatives may be provided to handle the re-enabling process when an already authenticated computer is not connected to a network (e.g. the Internet). One alternative is to program the software so that it will refuse to run if a network connection is not available. This approach, however, may be unacceptable for some vendors or users, as it requires the software to have a network connection in order to run. Another alternative is to program the software such that if the software cannot contact the server, it will allow the user to use the software, but will schedule itself to attempt to contact the server again after a predetermined time period such as a few minutes, and will continue the attempt until a network connection is established. This provides a weaker protection because a user could disconnect his computer from the Internet, or firewall the software so that it cannot contact the server, thereby allowing another copy of the software to run on another computer without disabling this existing copy. Such a protection may nevertheless be sufficient as most users are unlikely to be willing to cripple the functionality of their own computer to aid piracy for others. As yet another alternative, the software may be programmed to allow itself to run only a predetermined number of times without being re-enabled by the server.

As described earlier, the account_id is a server-generated id based on the user_id and password. It is cached by the computer, and used as a convenient and secure way for the computer to identify the user to the server in the re-enable process. Alternatively, the account authentication information (user_id and password) itself may be used in the re-enable process, and a separate account_id is not generated. In the latter case, instead of generating the account_id during initialization and returning it to the computer to be cached, the server may send the computer a command to cache the user_id and password and to use them in the subsequent re-enabling process. This is a less secure implementation because a cracker could steal the user_id and password from the client computer, and use them to move the license to his own computer. In the implementation that uses a server-generated account_id, even if the cracker steals the account_id, when he tries to move the license to his computer, the server will require the user_id and password information. Thus, only a user authenticated by user_id/password can move a license.

Described more generally, an account identification generated by the server from the user_id and password, if used, may be considered a part of the account authentication information. The account authentication information (either the user_id/password or the account_id) is stored on the server and the computer.

The software license management scheme described above is preferably implemented in software and is portable across any operating system or hardware.

To implement the software license management scheme, the server 12 maintains a database of user account information, which associates a software user's account with the license policy the user acquired and computers that have already been authenticated and are currently enabled to run the software. The database also contains information about computers associated with the account that are no longer licensed to run the software under the particular license agreement (a "black list"). The server executes an initialization program module and a re-enable program module which perform the various actions of the server described above. Thus, in one aspect, the present invention is a method performed by a server (more generally, a computer) that maintains the account database and executes the initialization and a re-enable program modules, as well as a server that is programmed to perform such functions.

To implement the software license management scheme, the software being licensed includes a program module that causes the client computer on which the software is installed to perform the various actions described above. Thus, in another aspect, the present invention is a method performed by the program module of the software, as well as the software module that perform the method.

In another aspect, the invention is a method performed by the joint actions of the user, the program module of the software, and the server, as well as a system that implements and facilitates the performance of such a method, including the server and the software module running on the user's computer.

From on the above descriptions, it is understood that various implementations of the license management and anti-piracy scheme according to embodiments of the present invention have the following advantages over some of the existing anti-piracy schemes. Unlike the Macromedia method discussed earlier and some other existing methods, the present anti-piracy scheme does not require the user to uninstall the software from the old (previously licensed) computer before installing it on a new computer. Rather, the license is automatically moved from the old computer during the licensing process of the new computer, thus avoiding some of the problems of Macromedia's algorithm. This makes it convenient for legitimate users to move their license from one computer to another. In addition, once the license is moved, the present anti-piracy scheme prevents the software from running on the previously licensed computer or limits its ability to run.

The present anti-piracy scheme also allows the software vendor to disable software on pirates' computers, while some other anti-piracy schemes do not allow the vendor to disable software that is known to be pirated, so that once an anti-piracy scheme is defeated for a computer, it is defeated for the life of that computer. The present scheme also provides a fail-back mechanism to re-enable an account, while some other anti-piracy schemes do not provide a fail-back mechanism and will potentially anger legitimate users who cannot use the software they have bought.

The present anti-piracy scheme can support many software licensing policies, from node locked to floating license to time-based policies. It is also operating system and computer platform portable.

The present anti-piracy scheme does not use any specialized hardware like smart cards, does not use any biometric information, does not require an Internet connection to implement (in the alternative implementations), does not require each software download or boxed software to be customized before distribution, does not require an update to disable pirated software, and does not require a large technical support team. As a result, it is simple and inexpensive to implement. It works for the case of mass distribution of software, and can reduce mass piracy of software.

As used in the present disclosure, the term "computer" includes any device with a processor capable of executing a program.

While many advantages are discussed here, they are not essential features of the present invention. The invention is defined in the claims that follow and may or may not have some or all of these advantages.

It will be apparent to those skilled in the art that various modification and variations can be made in the license management and anti-piracy method of the present invention without departing from the spirit or scope of the invention. Thus, it is intended that the present invention cover modifications and variations that come within the scope of the appended claims and their equivalents.

What is claimed is:

1. A method implemented on a server for managing licenses for a piece of software, comprising:
   (a) the server maintaining a user account database for the software, the database including, for each user account, account authentication information, information regarding a license policy, identifiers of computers licensed to run the software, and identifiers of computers no longer licensed to run the software;
   (b) the server facilitating initialization of the software for a first computer, including:
      (b1) receiving account authentication information and computer identification information from the first computer;
      (b2) executing a policy decision algorithm based on the computer identification information and the license policy associated with the user account corresponding to the account authentication information to make an enable or disable decision;
      (b3) when an enable decision is made, sending an enable command to the first computer to enable the first computer to run the software, and designating the first computer in the database as licensed to run the software;
      (b4) when a disable decision is made, sending a disable command to the first computer to disable the first computer from running the software; and
      (b5) when an instruction to move a license from another computer is received from the first computer in response to the disable command, sending an enable command to the first computer to enable the first computer to run the software, and designating the first computer in the database as licensed to run the software; and
   (c) the server facilitating re-enablement of the software for a second computer, the second computer being the same as or different from the first computer, including:
      (c1) receiving account authentication information and computer identification information from the second computer;
      (c2) executing a policy decision algorithm based on the computer identification information and the license policy associated with the user account corresponding to the account authentication information to make an enable or disable decision;
      (c3) when an enable decision is made, sending an enable command to the second computer to enable the second computer to run the software;
      (c4) when a disable decision is made, sending a disable command to the second computer to disable the second computer from running the software; and
      (c5) when an instruction to move a license from another computer is received from the second computer in response to the disable command, sending an enable command to the second computer to enable the second computer to run the software, and designating the second computer in the database as licensed to run the software.

2. The method of claim 1, wherein step (c) further includes:
   (c6) when an instruction to acquire a new license is received from the second computer in response to the disable command, sending an enable command to the second computer to enable the second computer to run the software, and designating the second computer in the database as licensed to run the software.

3. The method of claim 2, wherein in step (c6) the instruction includes payment information, and
   wherein step (c6) further includes processing a payment for a license before sending the enable command to the second computer.

4. The method of claim 2, where the server is connected to the second computer by a network,
   wherein in step (c1) the account authentication information and computer identification information are received via the network, and
   wherein in steps (c3), (c4), (c5) and (c6) the enable or disable command is sent via the network.

5. The method of claim 1, wherein step (c5) further includes:
   sending to the second computer a list of identifiers that identify computers presently licensed to run the software, and receiving from the second computer a selected identifier identifying a computer from which to move the license.

6. The method of claim 1, wherein in step (b1) the account authentication information includes a user id and a password,
   wherein step (b3) further includes generating an account identification from the user id and password and sending the account identification to the first computer, and
   wherein in step (c1) the account authentication information includes an account identification.

7. The method of claim 1, wherein in step (b2) a disable decision is made if the first computer has been designated in the database as no longer licensed to run the software.

8. The method of claim 1, wherein the server is connected to the first computer by a network,
   wherein in step (b1) the account authentication information and computer identification information are received via the network, and
   wherein in steps (b3) and (b4) the enable or disable command is sent via the network.

9. The method of claim 1, wherein step (b5) and (c5) further comprise designating the other computer in the database as no longer licensed to run the software.

10. The method of claim 9, further comprising:
    when a computer has been designated in the database as no longer licensed to run the software, removing the designation upon a request by a user.

11. A method implemented on a user computer for managing licenses for a piece of software, comprising:
    (a) initializing the software on the user computer, including:
       (a1) sending account authentication information and computer identification information to a server;
       (a2) receiving an enable or disable command from the server;
       (a3) when an enable command is received, enabling the user computer to run the software;
       (a4) when a disable command is received, disabling the user computer from running the software;
       (a5) when an instruction to move a license from another computer is received from the user, sending an instruction to the server to move a license from the other computer to the user computer or to obtain a new license; and (b) re-enabling the software on the user computer, including:
  (b1) sending account authentication information and computer identification information to a server;
  (b2) receiving an enable or disable command from the server;
  (b3) when an enable command is received, enabling the user computer to run the software;
  (b4) when a disable command is received, disabling the user computer from running the software, and presenting an option to a user to move an existing license from another computer to the user computer; and
  (b5) when an instruction to move a license from another computer is received from the user, sending an instruction to the server to move a license from the other computer to the user computer or to obtain a new license.

12. The method of claim 11, wherein step (b4) further including presenting an option to the user to acquire a new license for the user computer, and wherein step (b) further includes:
  (b6) when an instruction to acquire a new license is received from the user, sending an instruction to acquire a new license to the server.

13. The method of claim 12, wherein in step (b6) the instruction includes payment information.

14. The method of claim 12, where the user computer is connected to the server by a network,
  wherein in step (b1) the account authentication information and computer identification information are sent via the network,
  wherein in step (b2) the enable or disable command is received via the network, and
  wherein in steps (b5) and (b6) the instruction is sent via the network.

15. The method of claim 11, wherein step (b4) further includes receiving from the server a list of identifiers that identify computers presently licensed to run the software and presenting the list of identifiers to the user, and
  wherein step (b5) further includes receiving from the user a selected identifier identifying a computer from which to move the license, and sending the selected identifier to the server.

16. The method of claim 11, wherein in step (a1) the account authentication information includes a user id and a password,
  wherein step (a3) further includes receiving an account identification from the server and caching the account identification in the user computer; and
  wherein in step (b1) the account authentication information includes the account identification.

17. The method of claim 11, wherein the user computer is connected to the server by a network,
  wherein in step (a1) the account authentication information and computer identification information are sent via the network, and
  wherein in step (a2) the enable or disable command is received via the network.

18. A method for managing licenses for a piece of software, comprising:
  (a) maintaining a user account database for the software on a server, the database including, for each user account, account authentication information, information regarding a license policy, identifiers of computers licensed to run the software, and identifiers of computers no longer licensed to run the software;
  (b) initializing the software on a first computer, including:
    (b1) the first computer sending account authentication information and computer identification information to the server;
    (b2) the server executing a policy decision algorithm based on the computer identification information and the license policy associated with the user account corresponding to the account authentication information to make an enable or disable decision;
    (b3) when an enable decision is made, the server sending an enable command to the first computer, and designating the first computer in the database as licensed to run the software;
    (b4) the first computer enabling itself to run the software upon receiving the enable command;
    (b5) when a disable decision is made, the server sending a disable command to the first computer;
    (b6) the first computer disabling itself from running the software upon receiving the disable command, and presenting an option to a user to move an existing license from another computer to the computer or to obtain a new license;
    (b7) when an instruction to move a license from another computer is received from the user, the first computer sending an instruction to move a license to the server; and
    (b8) the server sending an enable command to the first computer upon receiving an instruction to move a license from another computer, and designating the first computer as licensed to run the software; and
  (c) re-enabling the software to run on a second computer, the second computer being the same as or different from the first computer, including:
    (c1) the second computer sending account authentication information and computer identification information to the server;
    (c2) the server executing a policy decision algorithm based on the computer identification information and the license policy associated with the user account corresponding to the account authentication information to make an enable or disable decision;
    (c3) when an enable decision is made, the server sending an enable command to the second computer;
    (c4) the second computer enabling itself to run the software upon receiving the enable command;
    (c5) when a disable decision is made, the server sending a disable command to the second computer;
    (c6) the second computer disabling itself from running the software upon receiving the disable command, and presenting an option to a user to move an existing license from another computer to the computer or to obtain a new license;
    (c7) when an instruction to move a license from another computer is received from the user, the second computer sending an instruction to move a license to the server; and
    (c8) the server sending an enable command to the second computer upon receiving an instruction to move a license from another computer, and designating the second computer as licensed to run the software.

19. The method of claim 18, wherein step (c6) further includes presenting an option to the user to acquire a new license for the computer, and wherein step (c) further includes:
  (c9) when an instruction to acquire a new license is received from the user, the second computer sending an instruction to acquire a new license to the server; and (c10) the server sending an enable command to the second computer upon receiving an instruction to acquire a new license, and designating the second computer as licensed to run the software.

20. The method of claim 19, wherein in step (c9) the instruction sent to the server includes payment information, and wherein step (c10) further includes processing a payment for a license before sending the enable command to the second computer.

21. The method of claim 19, where the server is connected to the second computer by a network, wherein in the re-enabling step information is sent between the server and the second computer via the network.

22. The method of claim 19, where in the re-enabling step information is sent between the server and the second computer via a user of the second computer and an agent having access to the server.

23. The method of claim 18, wherein step (c8) further includes sending to the second computer a list of identifiers that identify computers presently licensed to run the software, and receiving from the second computer a selected identifier identifying a computer from which to move the license.

24. The method of claim 18, wherein in step (b1) the account authentication information includes a user id and a password, wherein step (b3) further includes generating an account identification from the user id and password and sending the account identification to the first computer, wherein step (b5) further includes the first computer caching the account identification; and wherein in step (c1) the account authentication information includes an account identification.

25. The method of claim 18, wherein the server is connected to the first computer by a network, wherein in the initializing step information is sent between the server and the first computer via the network.

26. The method of claim 18, wherein in the initializing step information is sent between the server and the first computer via a user of the first computer and an agent having access to the server.

27. The method of claim 18, wherein in step (b2) a disable decision is made when the first computer has been designated in the database as no longer licensed to run the software.

28. The method of claim 18, wherein step (b8) and (c8) further comprise designating the other computer in the database as no longer licensed to run the software.

29. The method of claim 28, further comprising:

when a computer has been designated in the database as no longer licensed to run the software, removing the designation upon a request by the user.

* * * * *